United States Patent [19] | [11] 4,052,518
Borisov et al. | [45] Oct. 4, 1977

[54] METHOD FOR SEPARATING SEED COVER FROM ENDOSPERM OF GRAIN OF VARIOUS CEREAL CROPS

[76] Inventors: Vasily Nikolaevich Borisov, ulitsa Baumana, 14, kv. 12; Evgeny Alexandrovich Akulov, ulitsa Totmina, 13a, kv. 53; Alexei Ivanovich Solovei, ulitsa 4 Prigornaya, all of Krasnoyarsk, U.S.S.R.

[21] Appl. No.: 646,882

[22] Filed: Jan. 6, 1976

Related U.S. Application Data

[62] Division of Ser. No. 518,143, Oct. 25, 1974, Pat. No. 3,945,312.

[30] Foreign Application Priority Data

Dec. 19, 1973 U.S.S.R. .............................. 1974602

[51] Int. Cl.[2] .......................... A23P 1/00; A23N 7/00

[52] U.S. Cl. .................................... 426/482; 241/140; 426/483; 426/519

[58] Field of Search ............... 426/482, 483, 484, 519; 259/57; 99/605, 600, 604, 617; 241/140, 118

[56] References Cited

U.S. PATENT DOCUMENTS

| | | | |
|---|---|---|---|
| 2,204,039 | 6/1940 | Francois | 426/483 |
| 2,211,575 | 8/1940 | Mjolshess | 99/605 X |
| 2,366,711 | 1/1945 | Earle | 426/483 |
| 3,562,962 | 2/1971 | Ohno | 259/57 X |
| 3,734,752 | 5/1973 | Headley | 426/483 X |
| 3,790,690 | 2/1974 | Fritze | 426/482 X |

*Primary Examiner*—S. Leon Bashore
*Assistant Examiner*—Kenneth M. Schor
*Attorney, Agent, or Firm*—Haseltine, Lake & Waters

[57] ABSTRACT

A method is characterized by causing a container with grain loaded therein to perform two rotary motions, that is a rotary motion about its own axis and a rotary motion about an axis of rotation extending in parallel with and in the same plane as its own axis, with subsequent positive removal of seed covers. The method enables the separation of seed cover from endosperm of grain of various cereal crops without destructing endosperm. An apparatus for carrying out this method is provided with at least two containers mounted in a hollow casing in parallel relative to each other for rotation about their common axes and interconnected for combined rotation about a common axis of rotation extending in parallel with their own axes. The apparatus has means for charging grain communicated with the containers, as well as collectors for seed covers and endosperm of grain communicated with the containers.

2 Claims, 3 Drawing Figures

METHOD FOR SEPARATING SEED COVER FROM ENDOSPERM OF GRAIN OF VARIOUS CEREAL CROPS

The present invention is a division of the parent application Ser. No. 518,143, filed Oct. 25, 1974 and now U.S. Pat. No. 3,945,312.

The present invention relates to the grain milling and storage industry, and in particular to a method and apparatus for separating seed cover from the endosperm of grain of various cereal crops.

It is known that the seeds of all cereal crops consist of a coat including the floral envelope, pericarp and seed cover, as well as endosperm including the aleurone stratum and farinaceous stratum. The amount of cohesion between the seed cover and endosperm of grain varies from one cereal crop to another.

It is known to separate seed cover from the endosperm by using an apparatus comprising a hollow casing accommodating a rotatable container. The apparatus has a means for charging grain, communicating with the container and collectors for the removed seed covers and endosperm.

This known method of separating seed cover from the endosperm consists in the following.

Grain is fed, through charging means, into the container which is made to rotate. Thus, the grains, which are also made to rotate, are repelled by centrifugal force to the container walls and urged thereagainst to form a grain layer.

A rotating rotor accommodated in the container displaces the grain layer formed during the rotation so as to crush them and separate the seed cover in the form of small-sized pieces. Then the mass of partially cleaned grains and seed covers removed therefrom is screened on seaves where positive separation of seed covers from the endosperm takes place.

The application of the above-described method cannot ensure complete cleaning of the endosperm from seed cover.

One of the most important characteristics of grain is its ash content value. By the ash content of grain is meant the quantity of inorganic substances contained therein. These inorganic substances characterizing the ash content of grain are mainly present in the cover and in the aleurone stratum of the grain. High content of ash in the grain is indicative of low quality thereof.

Ash content of partially cleaned grain according to the above-described method is lowered only to 0.04% as compared to the ash content of grain which is not subjected to such treatment, so that the requirements imposed on the grain cleaned from seed cover cannot be met. Therefore, in order to further reduce the ash content, the grain is subjected to a repeated treatment in the above-described apparatus resulting in increased losses of the product, unproductive power consumption and longer time required for separation of seed covers.

During the separation of seed covers by the above-described method, due to difference in the shape and size of the grains and constant spacing between the inner surface of the peripheral wall of the container and rotor, concurrently with the removal of seed cover, the destruction of the endosperm of grain occurs in a part of grains, which are discharged along with the removed covers.

In addition, an important quantity of grains retain their seed covers intact so that the process of separating seed covers from the endosperm is to be repeated resulting in a longer time required for separation of seed cover.

The apparatus employed for carrying out this known method is only suitable for processing grains of a specific crop, such as wheat.

The apparatus is characterized by a low efficiency which is about 0.1 and large size, and is inconvenient in operation and maintenance.

It is an object of the invention to provide a method which enables the separation of seed cover from the endosperm of grain without destroying the endosperm.

Another object of the invention is to provide an apparatus for carrying out this method which will permit the productivity of the apparatus to be improved as compared to the known ones.

Yet another object of the invention is to provide an apparatus which will ensure the separation of seed covers from all grains charged into the container during a single processing cycle.

Still another object of the invention is to provide an apparatus having a smaller size than the known apparatus.

A further object of the invention is to provide an apparatus having an improved efficiency as compared to the known ones.

These and other objects are accomplished by the provision of a method for separating seed cover from the endosperm of grain of various cereal crops, wherein grain is charged into a container, then a rotary motion is imparted to the container with subsequent positive removal of the seed cover, wherein, according to the invention, concurrently with the rotation of the container about its own axis, an additional rotation is imparted to the container about an axis extending in parallel with and in the same plane as the axis of the container, the maximum acceleration of the grain in the container being selected within the range from 100 to 1000 g.

The above objects are also accomplished by the provision of an apparatus for carrying out the method according to the invention, comprising a hollow casing accommodating a container rotatable about its axis, communicating with means for charging grain and collectors for the removed seed covers and endosperm, wherein, according to the invention, there is provided at least one more container mounted in parallel with the first container for rotation about its axis, connected to the first container for combined rotation about a common axis extending in parallel with the axes of the containers, the ratio of the angular speeds of rotation of each container about its axis and about their common axis, respectively, complying with the condition:

$$\Omega^2 (R-r) > \omega^2 r,$$

wherein $\Omega$ is the angular speed of rotation of the containers about their common axis;

$R$ is the distance from the common axis of rotation to the axis of rotation of the container;

$\omega$ is the angular speed of rotation of the container about its axis;

$r$ is the radius of the container.

The transmission to the container with grain of two types of rotary motion ensures the application of two fields of centrifugal forces to the grain. Therefore, the grains in the container are subjected to the action of three-dimensional compression with an effort exceeding the ultimate strength of seed cover with concurrent displacement of the grains relative to the container and to each other.

The seed covers of the grains subjected to said three-dimensional compression are destroyed, whereafter, as a result of the relative displacement of the grains, the seed covers are separated from the endosperm. Concurrently with the removal of seed covers, they are separated from the mass of endosperm due to the difference in specific gravities thereof.

The method according to the invention permits separation of the seed cover from the endosperm without destroying the latter, whereby the quality of the endosperm is improved and the presence of pieces of endosperm among the removed seed covers is eliminated.

The proposed method provides for all grains charged into the container to be completely cleaned from seed cover. Therefore, no repeated treatment is required, whereby the time for separating seed cover from the endosperm is reduced as compared to the known method, while obtaining high quality of separation.

Complete separation of seed cover results in the reduction of ash content of the endosperm by 0.3 to 0% so that the cleaned endosperm may be subjected to further processing immediately after the separation of seed covers.

The selection of the ratio of angular speeds of rotation of each container about its axis and about the common axis, respectively, on the basis of the condition $\Omega^2(R-2)>\omega^2r$ ensures the displacement of grains in the container along closed paths during their three-dimensional compression. This can be achieved in the case where accelerations caused by the rotation of the containers about the common axis for grains located at a minimum distance from this axis of rotation are greater than the accelerations of the same grains caused by the rotation of the containers about their axes, which is expressed by the above-given condition.

The possibility of imparting maximum acceleration to the grains within the range from 100 to 1000 g enables the process of separation of seed cover from the endosperm to be accelerated.

The efficiency of the apparatus according to the invention is about 0.6, which is greater than the efficiency of the known apparatus.

The apparatus according to the invention is suitable for any kind of cereal crops. This is possible due to the employment of individual drives for rotation of containers about their common axis and about their individual axes, respectively, so that the gear ratio of each drive may be independently varied to control the separation of seed covers from the endosperm.

The apparatus according to the invention is considerably smaller in size and easier in maintenance than the known one.

According to the invention, the containers are mounted in the apparatus between upper and lower discs which are journalled on a column defining the common axis of rotation, each container having coaxially arranged loading and unloading throats for communication with means for charging grain and with a collector for the removed seed covers, respectively, the throats being journalled in the upper and lower discs, respectively, and each serving as an axis of rotation of a respective container.

The arrangement of the containers between the upper and lower discs permits distribution of the inertia forces, appearing during the rotation of the containers with grain about the common axis, among these discs, whereby the conditions for operation of support bearings are improved and the rigidity of the system is increased so that the process of separation of seed covers from the endosperm can be conducted with greater overloads than in the case of the cantilevered arrangement of the containers in the known apparatus.

According to the invention, the charging means is mounted on the upper disc and comprises a central pipe and radial troughs wherethrough it communicates with the loading throats of the containers.

Arranging the charging means on the upper disc enables the utilization of forces of gravity for feeding grain into the containers, while the central location of the pipe disposed in the zone of minimum rotational speeds ensures smooth transition from the linear motion of the grain to the rotary motion.

According to the invention, each container of the apparatus is provided with a perforated portion of the peripheral surface thereof for discharging the endosperm of grains during the rotation of the container into a collector for endosperm which is formed by the outer peripheral surface of the container and inner surface of the casing, and a collector for seed covers is formed between the inner surface of the casing and lower disc.

The perforated portion is located in that zone of the container, where the grain is cleaned from seed cover. The arrangement of the collectors for endosperm and seed covers between the outer peripheral surface of the containers and the inner surface of the casing, and between the inner surface of the casing and the lower disc, respectively, makes it possible to dispense with the use of independent collectors, whereby the construction of the apparatus is simplified and its cost is reduced.

According to the invention, in order to impart to the containers rotary motion about their axes, the apparatus is provided with a mechanism comprising a central gear driven by an individual drive, said gear being journalled on the column and meshing with planetary pinions mounted on the throats and for imparting to the containers the rotary motion about the column, which is the common axis of rotation, there is provided an individual drive which is operatively connected to the upper disc by means of a belt transmission, the upper disc being used as a pulley.

The employment of individual drives for rotating the containers about the common axis and about their respective axes enables an independent variation of the gear ratio of each drive so as to control the process of separation of seed covers from the endosperm.

The interconnection of the central gear and planetary pinions is effected by means of the external gearing, whereby the efficiency of the apparatus according to the invention is improved as compared to the known apparatus, and the size of the apparatus is reduced.

The location of the central gear level with the planetary pinions allows the unloading throats to be shorter and of the same length, whereby the path of movement of seed cover during its removal from the container after the separation is shortened to accelerate the separation cycle.

Other objects and advantages of the invention will become apparent from the following detailed description of a specific embodiment thereof with reference to the accompanying drawings, in which.

Figure 1:
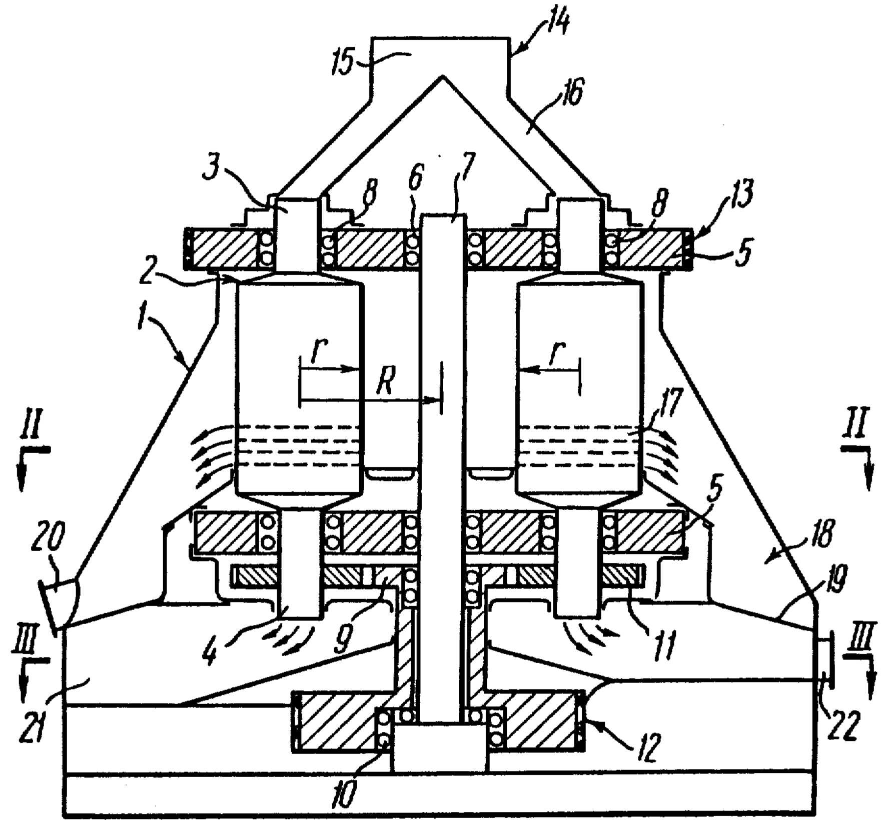
FIG. 1 is a diagrammatic front elevation view partially in section of an apparatus for separating seed cover from the endosperm of various cereal crops.

The apparatus for carrying out the method according to the invention comprises a hollow casing 1 (FIG. 1) and two containers 2 accommodated therein for rotation about their axes.

Each of the containers 2 is provided with a loading throat 3 and an unloading throat 4 coaxially disposed in the top and bottom parts thereof, respectively, the throats serving as rotational axes of the containers 2.

The containers 2 are mounted between two parallel discs 5 journalled by means of bearings 6 on a column 7 serving as a common axis of rotation of the containers 2.

Each of the containers 2 can rotate about its axis due to its being journalled by means of bearings 8 of the loading throats 3 and unloading throats 4, respectively, in the upper and lower discs 5.

Rotary motion about a respective axis is imparted to the containers 2 by means of a mechanism comprising a central gear 9 journalled by means of bearings 10 on the column 7. The gear 9 is in permanent engagement with planetary pinions 11 rigidly fixed to the unloading throats 4. The central gear 9 is rotated by an electric motor (not shown) by means of a belt transmission 12 (FIG. 1).

Rotary motion about the column 7, which is the common axis of rotation, is imparted to the containers 2 by means of an independent drive comprising an electric motor (not shown) and a belt transmission 13 (FIG. 1), the upper disc 5 being used as pulley.

The transmission of two types of rotary motion to the containers 2 with grain provides for application of two fields of centrifugal forces to the grain. Thus, the grains in the container 2 are subjected to a three-dimensional compression with an effort exceeding the ultimate strength of seed cover with concurrent displacement of the grains relative to the container and to each other, thereby resulting in the destruction of seed covers and their removal from the endosperm simultaneously with the separation of the removed seed covers from the endosperm.

The arrangement of the containers 2 with the planetary pinions 11 mounted thereon between two parallel discs 5 enables the distribution of inertial forces, appearing during the rotation of the containers 2 with grain about a common axis, among these two discs. This facilitates the operation of the bearings 8, improves the rigidity of the system and permits to conduct the process of separation of seed covers from the endosperm with greater overloads corresponding to accelerations within the range from 100 to 1000 g.

The ratio of the angular speeds of rotation of each container about its axis and about their common axis should comply with the condition:

$$\Omega^2(R-r) > \omega^2 r,$$

wherein $\Omega$ is the angular speed of rotation of the containers about their common axis;

R is the distance from the common axis of rotation to the axis of rotation of a container;

$\omega$ is the angular speed of rotation of the container about its axis;

$r$ is the radius of the container.

The compliance with the above-given condition is necessary to conduct the process of separation of seed cover from the endosperm.

The selection of the ratio of angular speeds of rotation of each container about its axis and about the common axis in accordance with the above-given condition ensures the displacement of grains in the container along closed paths with their three-dimensional compression. This can be achieved in the case, where acceleration caused by the rotation of the containers about their common axis of rotation for grains located at minimum distance from this axis of rotation are greater than accelerations of the same grains caused by the rotation of the containers about their axes, which is expressed by the above-given condition.

For feeding grain into the containers 2, there is provided a charging means 14 which is mounted on the upper disc 5. The means 14 comprises a central pipe 15 and radial troughs 16 through which it communicates with the loading throats 3 of the containers 2.

The arrangement of the charging means 14 on the upper disc 5 enables the utilization of forces of gravity for feeding grain into the containers 2, while the central location of the pipe 15 disposed in the zone of minimum speeds rotation of the containers about their axes ensures smooth transition from the linear motion to the rotary motion.

Figure 2:
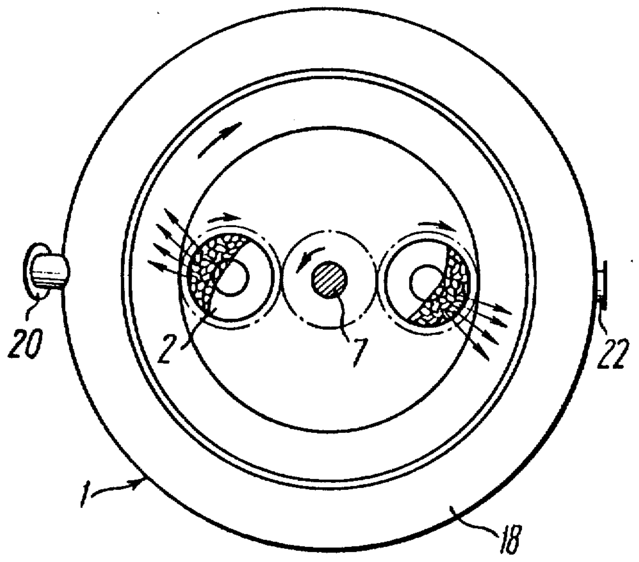
FIG. 2 is a sectional view taken along the line II—II of FIG. 1.

The peripheral surfaces of the containers 2 are provided, in the zone where the grain is cleaned from seed cover, with a perforated portion 17 for discharging the endosperm during the rotation of the containers 2 into a collector 18 for endosperm (FIGS. 1, 2). The collector 18 is formed by the outer peripheral surface of the containers 2 and inner surface of the casing 1. The bottom wall 19 of the collector 18 comprises a cylindrical shell rigidly fixed to the casing 1. The shell is provided with a pipe 20 for discharging the grain from the collector 18.

For collecting seed covers separated from the endosperm, a collector 21 for seed covers (FIG. 1, 3) is provided between the inner surface of the casing 1 and the lower disc 5, the collector comprising a ring with a pipe 22 fixed thereto for discharging seed cover from the apparatus.

The arrangement of the collectors for endosperm and seed covers between the outer peripheral surface of the containers and inner surface of the casing, as well as between the inner surface of the casing and lower disc, respectively, makes the apparatus simpler and more compact.

The apparatus according to the invention carries out the method according to the invention in the following manner.

The electric motor is energized to rotate the containers 2 about their axes (FIG. 1). The rotary motion is transmitted from the electric motor connected to the central gear 9 by means of the belt transmission 12 to rotate this gear, and then to the containers 2, via the planetary pinions 11 meshing therewith, to rotate the containers.

Due to the presence of friction forces in the gearing of the gear 9 and the planetary pinions 11, as well as in the bearings 8, the containers 2 start rotating about the common axis of rotation, and this rotation is transmitted to the discs 5. When the rotational speed of the discs attains 100 rpm, the second electric motor is energized to transmit, via the belt transmission 13, and additional rotation to the discs 5, and hence to the containers 2 journalled in the discs by means of the loading throats 3 and unloading throats 4.

Then the apparatus is pre-adjusted to gain predetermined operation conditions which are as follows:

$$\Omega^2(R-r) > \omega^2 r$$

The direction of rotation of the discs 5 and containers 2 is of no importance.

Then grain is fed through the central pipe 15 and the troughs 16 of the charging means 14 into the loading throats 3 of the containers 2.

As the grain accumulates in the containers 2, their angular speeds of rotation about a respective axis and about the common axis start changing. During this period of fluctuation of the ratio of the angular speeds of rotation of the containers about the axes and about the common axis, the required operating conditions of the apparatus are restored by varying the angular speeds of the electric motors. The control of the ratio of the angular speeds is effected until the amount of grain entering the containers 2 becomes equal to the total amount of seed covers and endosperm of grain leaving the containers.

The grain charged into the containers 2 is subjected to the action of two types of rotary motion thereon. Two fields of centrifugal forces act on the grain. Thus, the grains in the container are subjected to a three-dimensional compression with an effort exceeding the ultimate strength of seed cover with concurrent displacement of the grains relative to the container and to each other.

Seed covers of the grains subjected to said three-dimensional compression are destroyed, whereafter seed covers are removed from the endosperm as a result of the relative displacement of the grains. Concurrently with the removal of seed covers, they are separated from the mass of endosperm of grains due to the difference in specific gravities.

Figure 3:
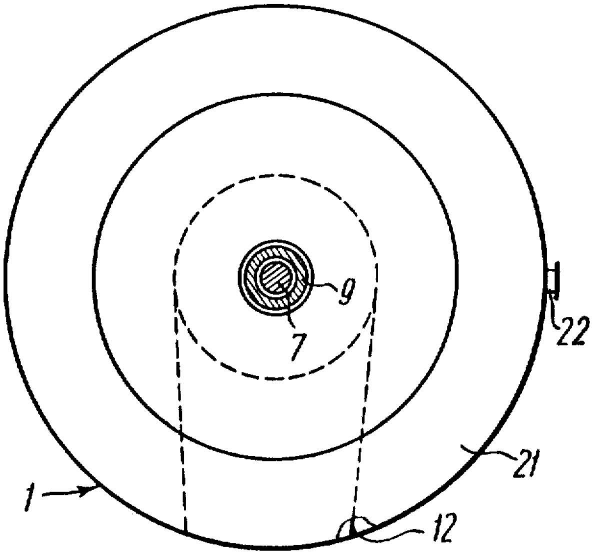
FIG. 3 is a sectional view taken along the line III—III of FIG. 1.

Having a low specific gravity and a large specific surface, the seed covers are accumulated adjacent to the axes of rotation of the containers 2 and, due to a pressure difference in the air medium appearing as a result of movement of the unloading throats about the common axis of rotation and/or due to a positive suction through the pipe 22, the seed covers are discharged through the unloading throat 4 into the collector 21 and therefrom through the pipe 22 (FIG. 3), from the apparatus.

As the grain descends in the container under gravity, it is completely cleaned from seed covers and reaches the perforated portion 17 of the container 2.

The endosperm which is now cleaned from seed cover, is expelled through the perforation under the action of centrifugal forces into the collector 18 for endosperm (FIG. 2) and is then discharged from the apparatus under gravity or by a pneumatic transporting means.

The destruction of seed covers and their removal from the endosperm occur with acceleration of the grains in the container within the range from 100 to 1000 g. Acceleration is selected depending on the crop.

Thus, for wheat, acceleration is selected within the range from 100 to 180 g. For White-Grained wheat the acceleration is selected equal to 120 g, for Rock wheat 170 g.

For rice, acceleration is selected within the range from 400 to 600 g. For Dalnevostochnyj rice the acceleration is selected equal to 560 g.

For barley acceleration is selected within the range from 800 to 1000 g. For "spring" barley this acceleration is 940 g.

The results of tests for determination of the ash content of wheat and rice are given in the following tables.

The method according to the invention permits to separate seed covers from endosperm of grain without destroying the latter. This improves the quality of the endosperm and eliminates its presence in the removed seed covers after their separation.

With the employment of the method according to the invention all grains charged into the containers of the apparatus are completely cleaned from seed cover during a single processing cycle so that no repetition thereof is required.

The method according to the invention permits to reduce the ash content of the endosperm to 0.3–0.6% so that the cleaned endosperm can be subjected to further processing immediately after the separation of seed covers.

The possibility of imparting acceleration within the range from 100 to 1000 g to the grains permits to accelerate the process of separation of seed cover from the endosperm grains and to separate seed covers of any cereal crop.

Table 1

| Origin | Crop, variety | Sample No. | Ash content of sample | Ash content after treatment | Ash content reduction | % of crashed grains |
|---|---|---|---|---|---|---|
| USA | Wheat "White-Grained" | 1 | 1.62 | 1.42 | 0.20 | 0 |
| | | 2 | 1.62 | 1.31 | 0.31 | 0 |
| | | 3 | 1.62 | 1.43 | 0.19 | 0 |
| | | 4 | 1.62 | 1.28 | 0.34 | 0 |
| | | 5 | 1.62 | 1.37 | 0.25 | 0 |

Table 2

| Origin | Crop, variety | Sample No. | Ash content of sample | Ash content after treatment | Ash content reduction | % of crashed grains |
|---|---|---|---|---|---|---|
| | Wheat "South-Australian" | 1 | 1.51 | 1.40 | 0.11 | 0 |
| | | 2 | 1.58 | 1.41 | 0.17 | 0 |
| | | 3 | 1.54 | 1.44 | 0.10 | 0 |
| Australia | "White-Grained" | 4 | 1.58 | 1.40 | 0.18 | 0 |
| | | 5 | 1.60 | 1.46 | 0.14 | 0 |

Table 3

| Origin | Crop, variety | Sample No. | Ash content of sample | Ash content after treatment | Ash content reduction | % of crashed grains |
|---|---|---|---|---|---|---|
| | Rice | 1 | 1.35 | 0.66 | 0.69 | 0 |
| | | 2 | 1.35 | 0.69 | 0.66 | 0 |
| | | 3 | 1.35 | 0.56 | 0.79 | 0 |

The efficiency of the apparatus according to the invention is as high as 0.6. The apparatus is simple and compact.

What is claimed is:

1. A method for separating seed cover from endosperm of grain of various cereal crops comprising the steps of: continuously charging grain into a container; continuously imparting to the container a rotary motion about its own axis and imparting concurrently an additional rotary motion about an axis of rotation extending in parallel with and in the same plane as the axis of the container, the acceleration of the grain in the container being applied within the range from 100 g to 1000g for a period of time such that the seed covers are separated from the endosperm of the grain, and continuously discharging seed cover and endosperm from the container.

2. A method as defined in claim 1, including the step of discharging the separated grain and covers as separate streams, the ratio of the angular speeds of rotation of each container about its axis and about their common axis, respectively, is determined by the relation $$\Omega^2 (R - r) > \omega^2 r$$

where $\Omega$ is the angular speed of rotation of the containers about their common axis, $R$ is the distance from the common axis of rotation to the axis of rotation of the containers, $\omega$ is the angular speed of rotation of the container about its axis $r$ is the radius of the container.

* * * * *